United States Patent
Knee et al.

(10) Patent No.: US 7,840,068 B2
(45) Date of Patent: Nov. 23, 2010

(54) SYSTEM AND METHOD FOR VIDEO PROCESSING BY IMAGE SEGMENTATION

(75) Inventors: Michael James Knee, Petersfield (GB); Martin Weston, Petersfield (GB)

(73) Assignee: Snell Limited, Hampshire (GB)

( * ) Notice: Subject to any disclaimer, the term of this patent is extended or adjusted under 35 U.S.C. 154(b) by 616 days.

(21) Appl. No.: 10/527,911

(22) PCT Filed: Sep. 12, 2003

(86) PCT No.: PCT/GB03/03978
§ 371 (c)(1), (2), (4) Date: Nov. 7, 2005

(87) PCT Pub. No.: WO2004/025557
PCT Pub. Date: Mar. 25, 2004

(65) Prior Publication Data
US 2006/0110038 A1    May 25, 2006

(30) Foreign Application Priority Data
Sep. 12, 2002    (GB) .................................. 0221144.9

(51) Int. Cl.
*G06K 9/34* (2006.01)
(52) U.S. Cl. .................. 382/173; 382/164; 382/171
(58) Field of Classification Search ................. 382/164, 382/171, 173
See application file for complete search history.

(56) References Cited

U.S. PATENT DOCUMENTS

| | | | | |
|---|---|---|---|---|
| 4,078,860 A | * | 3/1978 | Globus et al. .................. 352/69 |
| 4,771,331 A | * | 9/1988 | Bierling et al. ........ 375/240.01 |
| 5,606,164 A | * | 2/1997 | Price et al. ............. 250/339.09 |
| 5,848,198 A | * | 12/1998 | Penn .......................... 382/276 |
| 6,173,077 B1 | * | 1/2001 | Trew et al. .................. 382/236 |
| 6,535,632 B1 | * | 3/2003 | Park et al. .................... 382/164 |
| 6,728,706 B2 | * | 4/2004 | Aggarwal et al. .............. 707/5 |

FOREIGN PATENT DOCUMENTS

EP    0 393 541    10/1990

OTHER PUBLICATIONS

Min et al.; "Progress in Automated Evaluation of Curved Surface Range Image Segmentation"; Sep. 3-7, 2000, International Conference on Pattern Recognition; vol. 1, pp. 644-647.*

(Continued)

*Primary Examiner*—Vikkram Bali
*Assistant Examiner*—Eueng-Nan Yeh
(74) *Attorney, Agent, or Firm*—Pearl Cohen Zedek Latzer, LLP

(57) ABSTRACT

Video data is segmented by representing the pixel location, RGB values and other features such as motion vectors, as points in a multidimensional segmentation space. Initialized segments are represented as locations in the segmentation space and segment membership then determined by the distance in segmentation space from the data point representing the pixel to the location of the segment. The distance measure takes into consideration the covariance of the data, for the segment or for the picture.

22 Claims, 2 Drawing Sheets

OTHER PUBLICATIONS

Castagno R., et al: "Video segmentation based on multiple features for interactive multimedia application" IEEE Transactaions on Circuits and Systems for Video Technology, IEEE Inc., New York. US., vol. 8, No. 5, Sep. 1, 1998, pp. 562-571, XP000779453. ISSN: 1051-8215.

Stephen D. Scott: "Lecture 7: Clustering: Basic Concepts," Internet 'Online! 2001', XP002272720. Retrieved from the Internet: <URL: http://csce.unl.edu/sscott/CSCE970-spr01/slides/7:cluster-basic.pdf>, (Published before this application Sep. 12, 2002).

Ohm J-R, et al: "Feature-based cluster segmentation of image sequences," Image Processing, 1997, Proceedings., International Conference On Santa Barbara, CA, USA Oct. 26-29, 1997, Los Alamitos, CA, USA, IEEE Comput. Soc, US. Oct. 26, 1997, pp. 178-181, XP010253706.

PCT International Search Report of International Application No. PCT/GB03/03978, (Mar. 8, 2004).

Yung et al "Segmentation of colour images based on the gravitational clustering concept" Optical Engineering, Soc of Photo-Optical Instrumentation Engineers 37 No. 3 Mar. 1, 1998 pp. 989-1000.

Hwajeong et al "Colour image segmentation based on clustering using color space distance and neighbourhood relation among pixels" Journal of Korea Inf. Sci. Soc. Software and Applications Oct. 2000, vol. 27 No. 10 pp. 1038-1045.

Andrei Rares, "Object-based video analysis using the EM algorithm", Information and Communication Theory Group, TU Delft, Jul. 17, 2000.

J. Rissanen, "MDL Denoising", IBM Research Division, Almaden Research Center, DPE-B2/802, San Jose, CA 95120-6099, rissanen@almaden.ibm.com, Jan. 12, 1999.

A. Rares et al, "Object Tracking By Adaptive Modeling", © 2000 IEEE. Published in the 2000 International Conference on Image Processing (ICIP-2000), scheduled for Sep. 10-13, 2000 in Vancouver, BC.

* cited by examiner

SYSTEM AND METHOD FOR VIDEO PROCESSING BY IMAGE SEGMENTATION

PRIOR APPLICATION DATA

The present application is a national phase application of International Application PCT/GB03/03978, entitled "Image Processing" filed on Sep. 12, 2003, which in turn claims priority from United Kingdom application 0221144.9, filed on Sep. 12, 2002, both of which are incorporated by reference in their entirety.

FIELD OF THE INVENTION

This invention is directed to image segmentation and in an important example to the segmentation of sequences of images, such as video.

BACKGROUND OF THE INVENTION

There are many methods of image segmentation in existence. Classical methods of segmenting an image described by a one-dimensional parameter (e.g. luminance) fall into two categories, those based on edge detection (e.g. the Sobel operator) and those based on region detection (e.g. sieves, watershed transforms). Work has also been done on segmentation of images described by two or more parameters (e.g. colour components). For this purpose histogram processing is often used. It has been suggested that a model of gravitational clustering be employed in RGB measurement space, (see Yung et al "Segmentation of colour images based on the gravitational clustering concept" Optical Engineering, Soc of Photo-Optical Instrumentation Engineers 37 No. 3 1 Mar. 1998 pp 989-1000). It has also been suggested to employ gravitational clustering in a measurement space which includes not only colour information, but also location information for each pixel, (see, Hwajeong et al "Colour image segmentation based on clustering using color space distance and neighbourhood relation among pixels" Journal of Korea Inf. Sci. Soc. Software and Applications October 2000, Vol. 27 No. 10 pp 1038-1045).

The prior art methods of segmentation require excessive computational processing before useful results can be achieved. The concept of gravitational clustering depends upon on a relatively large number of iterations per image, with the "mass" of each segment changing as the iterations proceed. Small changes in the initialization and termination conditions have marked and not always predictable effects on performance. Although the use of a multi-dimensional space (incorporating both colour space and pixel location) is beneficial, performance becomes critically dependent on the relative scaling in the respective dimensions. Prior art methods have not been found to work well with sequences of images—video, for example—where rapid and reliable segmentation decisions are essential.

SUMMARY OF THE INVENTION

It is an object of aspects of the present invention to provide improved methods of image segmentation that are capable of providing rapid and reliable segmentation decisions.

Accordingly, the present invention consists in one aspect in a method of segmenting image data having a plurality of feature values as each pixel, in which the data is represented as points in a segmentation vector space which is the product of the vector space of feature values and the vector space of pixel addresses, wherein segments are represented as locations in the segmentation vector space, and the membership of a segment for each pixel is determined by the distance in segmentation vector space from the data point representing the pixel to the location of the segment. The segments may be represented by points. The segments may be represented as linear functions mapping the vector space of pixel locations to the vector space of pixel values.

It has been found that a segmentation method in which membership of a segment is determined by an appropriate measure of distance provides more reliable segmentation than can be achieved by gravitational clustering. It has also been found that methods according to this invention, when appropriately initialized, can reach segmentation decisions without the need for large numbers of iterations. In the case—for example—of video, segment decisions from the preceding image will in many cases provide sufficiently good initialization for reliable segmentation to be achieved in a single step.

Accordingly, the present invention consists in another aspect in a method of segmenting video data having a plurality of feature values at each pixel in a sequence of pictures, in which the data is represented as points in a segmentation vector space which is the product of the vector space of feature values and the vector space of pixel addresses, and wherein segments are represented as locations in the segmentation vector space, the method comprising the steps for each picture of initially assigning pixels to segments according to the segment membership of the respective pixel in the preceding picture in the sequence; calculating the location in segmentation vector space for each initial segment utilizing feature values from the current picture and determining the membership of a segment for each pixel according to the distance in segmentation vector space from the data point representing the pixel to the location of the segment.

According to a further speed, the present invention consists in a method of segmenting image data having a plurality of feature values at each pixel, in which the data is represented as points in a segmentation vector space which is the product of the vector space of feature values and the vector space of pixel addresses, comprising the steps of scaling the image data so as substantially to equalize the variance of the data in at least one dimension of the pixel address and each dimension of the feature value; initially assigning pixels to segments; representing each segment as a location in the segmentation vector space; and determining the membership of a segment for each pixel according to the distance the segmentation vector space from the data point representing the pixel to the location of the segment.

According to yet a further aspect, the present invention consists in a method of segmenting image data having a plurality of feature values at each pixel, comprising the steps of representing the image data as points in a segmentation vector space which is the product of the vector space of feature values and the vector space of pixel addresses in a toroidal canvas; initially assigning pixels to segments represented as locations in the segmentation vector space, and determining the membership of a segment for each pixel according to a distance measure from the data point representing the pixel to the representation of the segment.

By representing the pixel addresses on a toroidal canvas, the problem is avoided of the disappearance and reappearance of objects because of global motion in the scene.

DESCRIPTION OF THE DRAWING

The invention will now be described by way of example with reference to the accompanying drawing which is a block diagram illustrating a method according to the present invention.

The general aim of a segmentation method is to partition the image or picture into a number of segments, taking into account the location and value of each pixel. For moving sequences, it is additionally desirable to have a smooth transition in the segmentation from one picture to the next.

In the approach taken by this invention, the picture is represented in multidimensional space, which will here be called the universe. This is the product of the ordinary two-dimensional space of the picture, which we shall call the canvas, and the pixel space, which is the space in which the pixel or feature values themselves are defined. For example, when segmenting an RGB picture, the pixel space will have three dimensions and the universe will therefore have five dimensions.

Figure 1:
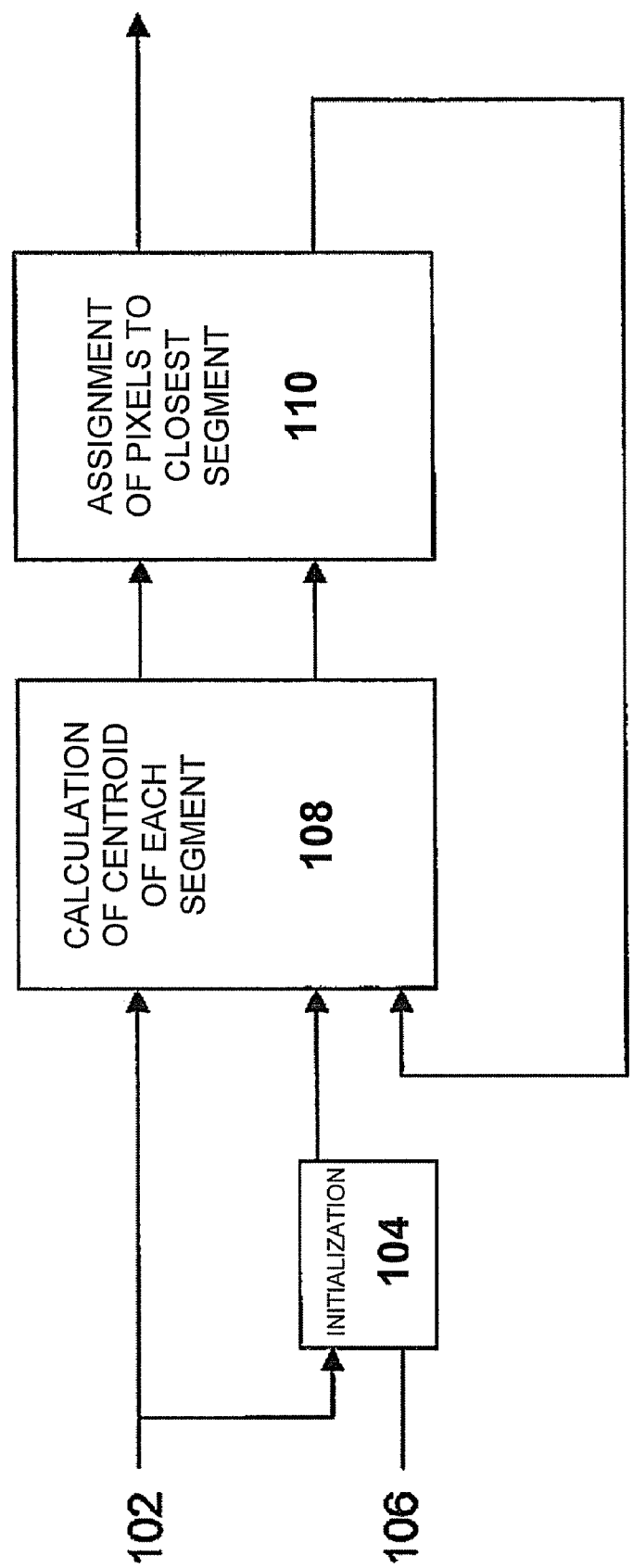
FIG. 1 is a block diagram describing a method according to an embodiment of the present invention.
Figure 2:
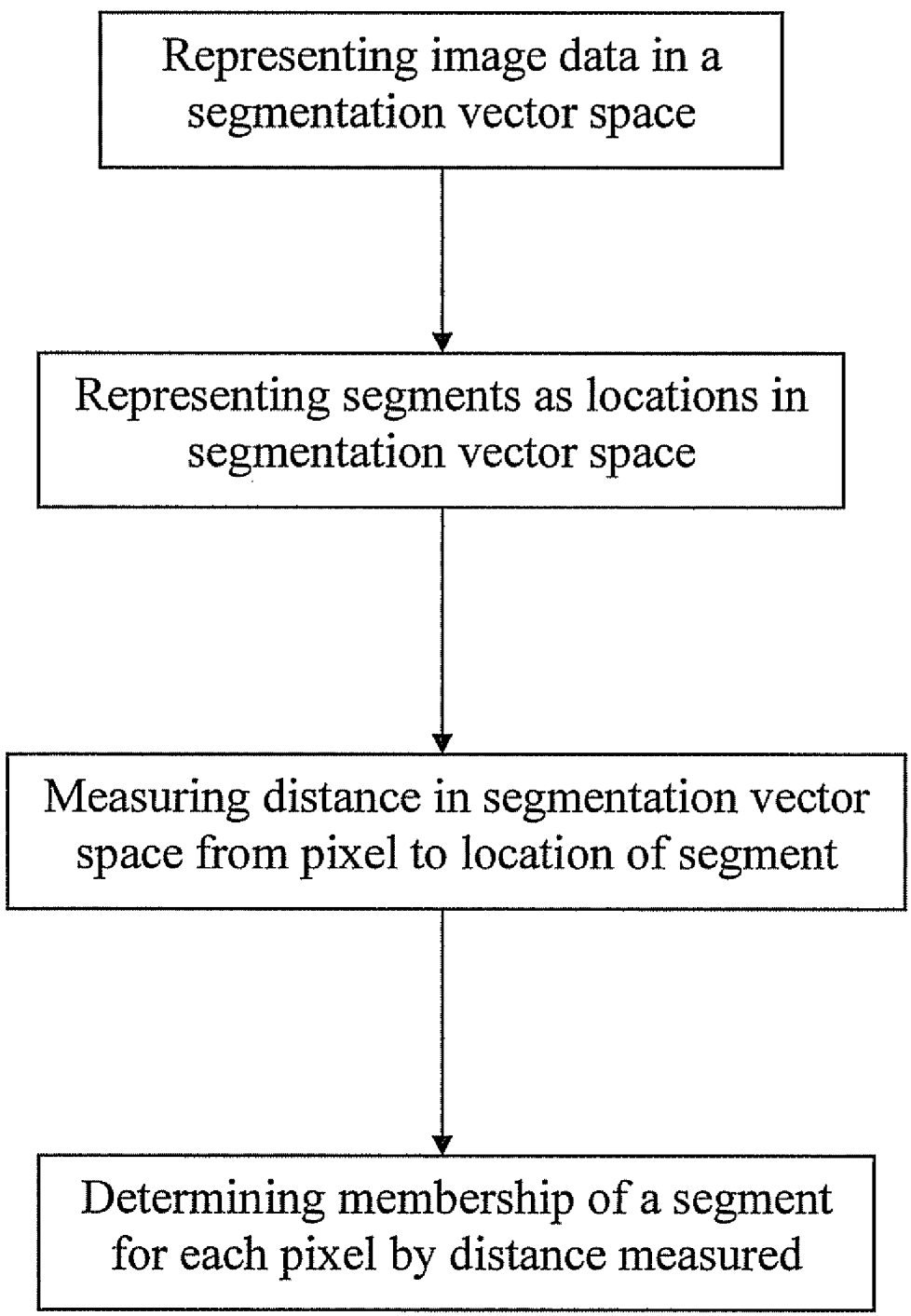
FIG. 2 is a flow chart describing a method according to an embodiment of the present invention.

Referring to FIGS. 1 and 2, the picture is represented as a set of points in the universe, one for each pixel. The co-ordinates of the pixel in the universe describe its position on the canvas together with its value in pixel space. Segmentation in this example is simply a partitioning of the set of pixels into a fixed number of subsets.

Referring to FIG. 1, the method starts with some initial segmentation of the picture at terminal 102 into the desired number of segments. At the very start of a sequence, this initialization is performed in box 104 and might correspond to a straightforward division of the canvas into equal areas. More complex initialization procedures may take image data into account and may select dynamically the appropriate number of segments. The chosen number of segments may also be externally input at 106. Subsequently, the initial segmentation may be the segmentation of the previous picture. The processor at box 108 then calculates (as described more fully below) the centroid of each segment according to the values of the segment's pixels in the universe. In box 110, a measure is then taken of the distance in the universe between each pixel and the centroid of each segment and each pixel is reassigned to the segment with the closest centroid.

These two steps of determining the location of each segment—by calculating the centroid—and assigning pixels to the closest segment, may be repeated once or more using the same picture. The result is a new segmentation, which may be used as the initial segmentation for the next picture.

Performing several iterations is likely to be necessary when segmenting a single picture starting from trivial initial conditions. However, for moving sequences, there may be little to be gained from performing more than one iteration per picture.

A segmented version of the picture can be created by replacing the pixel values in each segment with the projections of the segment centroids onto the pixel space.

The example will be taken of a nine-dimensional segmentation vector space, representing the pixel address and seven feature values for each pixel, thus:

$x_1$, the horizontal spatial coordinate $x_2$, the vertical spatial coordinate $x_3$, the red component of the video signal expressed in 8-bit values $x_4$, the green component of the video signal expressed in 8-bit values $x_5$, the blue component of the video signal expressed in 8-bit values $x_6$, a texture measure for the video, for example the standard deviation of the luminance over a 5×5 block centred on the current pixel $x_7$, the horizontal component of a motion vector expressed in pixels per frame period.

$x_8$, the vertical component of a motion vector expressed in pixels per frame period $x_9$, the value of a displaced frame difference when a motion model for the segment is applied to the luminance data.

If $(x_1, x_2, \ldots, x_N)_k$, $k \in S$ are vectors in the multidimensional space belonging to segment S, then the centroid of the segment is given by $$(\mu_1, \mu_2, \ldots, \mu_N) = \frac{1}{K_S} \sum_{k \in S} (x_1, x_2, \ldots, x_N)_k$$

where $K_S$ is the number of points in segment S.

The Euclidean distance measure from a point $x = (x_1, x_2, \ldots, x_N)$ to the segment S is then equal to $$\sum_{n=1}^{N} (x_n - \mu_n)^2$$

Then a suitably scaled distance measure might be given by $(x_1-\mu_1)^2 + (x_2-\mu_2)^2 + 0.5(x_3-\mu_3)^2 + 1.5(x_4-\mu_4)^2 + 0.3(x_5-\mu_5)^2 + 3x_6^2 + 10(x_7-\mu_7)^2 + 10(x_8-\mu_8)^2 + 2x_9^2$ The performance of a segmentation method depends on the relative scaling of the co-ordinate axes in the universe. For example, if on the one hand the canvas co-ordinates are multiplied by a large scaling factor, the algorithm will tend to pay more attention to the spatial component of the overall Euclidean distance and the final segmentation will look more like a simple partitioning of the canvas. If on the other hand the pixel space co-ordinates are given a large scaling factor, the segmentation will be dominated by pixel values and each segment will be spread across the canvas, giving a result closer to simple histogram analysis.

In a preferred approach, good performance is achieved by setting the relative scaling factors of the co-ordinate axes so as to equalize the variances of the pixels in all the dimensions of the universe. An exception to this rule is that the canvas co-ordinates are arranged to have equal scaling determined by the wider (usually horizontal) co-ordinate.

Other embodiments employ methods of dynamically varying the relative scaling in order to minimize some error measure. For example, the coordinate axes may be scaled so as to minimize the product of errors evaluated along each axis, with the constraint that the scaling factors sum to a constant value.

In a preferred form of the invention, a distance measure is employed which takes into account the covariance of the image data.

The Euclidean distance measure used above can also be expressed in vector notation as $(x-\mu) \cdot (x-\mu)^T$. The so-called Mahalanobis distance measure can then be defined as equal to $(x-\mu) \cdot \Lambda^{-1} \cdot (x-\mu)^T$ where $\Lambda$ is the covariance matrix of the data in the segment, given by $$\Lambda_{ij} = \frac{1}{K_S - 1} \sum_{k \in S} (x_{ik} - \mu_i)(x_{jk} - \mu_j)$$

Other variations on the basic Euclidean distance are also possible. One possibility, which is simpler to implement in hardware, is the Manhattan distance or L−1 norm. This is the distance between two points measured by walking parallel to the co-ordinate axes. Another possibility is to take the maximum of the differences measured along the co-ordinate axes.

In certain applications it will be useful to employ distance measures which take into account the covariance matrix, in ways other than the precise Mahalanobis distance, and which may additionally include components based on the mass of the segment. In certain applications it will be advantageous to use a version of the Mahalanobis distance which is based on the covariance matrix of all the data, not taken segment by segment.

A simpler version of the Mahalanobis distance ignores the off-diagonal elements of the covariance matrix and simply compensates for the different variances along the coordinate axes.

The number of segments may be a parameter chosen by the user. In alternatives, the number of segments is chosen as a function of the input data. For example, the number of segments may be chosen so that the variance of the overall segmentation error approaches a predetermined constant value.

It is possible that a segment may disappear after some frames if its centroid turns out to be further from every pixel than some other segment. In many cases, this is desirable behaviour, as when an object disappears from the screen. In other embodiments, the mechanism may allow for the introduction of new segments. Particular algorithms may establish criteria for splitting an existing segment into two, and possibly also for merging segments that end up being close together in the universe. Another approach to deciding whether to add or remove segments is to run two or more parallel versions of the algorithm with different numbers of segments and to base the decision on the difference in overall error between the two versions.

One solution to the problem of the disappearance and reappearance of objects because of global motion in the scene is to impose a toroidal structure on the canvas. This is done by stitching the left edge to the right edge and the top edge to the bottom edge. Centroids that disappear off one edge will now reappear at the opposite edge and will be available for re-use. Care needs to be taken in the distance definition to make sure that the shortest distance is used.

Certain embodiments use a pixel space in which the coordinates are simply the luminance, YUV or RGB values of the pixels. Others look at segmentation on the basis of motion vectors preferably derived in a phase correlation process. There are many other possibilities for features that can be included in the pixel space, for example local measures of noise or texture, or Gabor jets. For this reason, the pixel space (or the whole universe) is sometimes referred to as the feature space.

The description so far assumes that each pixel belongs to just one segment, so that assignment of pixels to segments is a hard decision. It is possible to replace this with a soft decision, in which each pixel carries a set of probabilities of membership of each segment. The output of the algorithm can be based on a hardened version of the decision (assigning the segment with the highest probability) while the soft decision is retained for the recursive processing. Alternatively, the soft decision may have significance in the output of the algorithm. For example, if the pixel space consists of motion vectors, the output may consist of several motion vectors assigned to each pixel, each with a relative weight.

In more detail, the action of choosing a segment for a pixel can be thought of as allocating a weight to the pixels membership of each segment. In "hard" segmentation decisions, one of the weights is set to 1 and the others are set to 0, the choice being made according to which segment is "nearest" (by Mahalanobis, Euclidean or other distance measure) to the pixel concerned. A generalization of this is to make "soft" segmentation decisions, where the weights are constrained only to be between 0 and 1 and to sum to 1 across the segments. The weight for each segment could be calculated as a function of the distance measures. An example of a suitable function for pixel x is $$p_m(x) = \frac{e^{-d_m(x)}}{\sum_{m'=1}^{M} e^{-d_{m'}(x)}}$$

where M is the number of segments and $d_m(x)$ is the distance measure for segment m. If the overall model is based on multivariate Gaussian distributions, the weight calculated by the above function can loosely be interpreted as a "probability of membership" of each segment.

The weights can be used in various ways.

For example, in updating the segment centroids with new picture data, the centroid for each segment can be calculated as a weighted average of picture data across the whole picture, rather than an average across the segment. In this way each pixel contributes to a number of segments, each time in accordance with the probability that the pixel belongs to that segment. At the output of the process, a hard decision could be made for each pixel by simply choosing the segment with the maximum weight, but the weight could be retained for use as a "confidence measure" in further processing. For example, a motion vector output could be given a confidence measure which could be used to control a mix between a motion compensated signal and some fallback (e.g. non-motion-compensated) signal.

Alternatively, two or more (up to M) output values for each pixel could be retained together with their weights. For example, several motion vectors could be retained and each used to calculated motion compensated signal which could ultimately be combined by forming a weighted average.

Motion vectors give rise to the possibility of an additional component in the distance metric, based on the error in the pixel domain when the motion vector is applied to a picture. This displaced frame difference can be incorporated into the distance metric with appropriate scaling. The result is a segmentation that takes into account the fidelity of the motion compensated prediction.

Embodiments of this invention provide a number of important advantages. The described methods perform fast and (subjectively) very well on demanding picture material. The variation in the segmentation from one frame to the next is generally small; this is especially important for video. Moreover, segmentation decisions can frequently be taken in a single step. This not only reduces processing time but also increases reliability. With the scaling chosen, the segments are not necessarily contiguous but the parts of each segment remain close together. Replacement of "raw" motion vectors by a segmented version can improve the overall quality of the motion vector field.

It will be appreciated by those skilled in the art that the invention has been described by way of example only, and that a wide variety of alternative approaches may be adopted.

The invention claimed is:

1. A method of segmenting in a processor image data having a plurality of feature values at each pixel in a sequence of pictures, the feature values including pixel values and motion vector values, comprising:
   representing the data as points in a segmentation vector space which is the product of a vector space of feature values and a vector space of pixel addresses,
   representing segments as locations in the segmentation vector space,
   calculating a displaced frame difference by applying a motion vector from the segment to the pixel, and
   determining, using said processor, the membership of a segment for each pixel by a distance measured in segmentation vector space from the data point representing the pixel to the location of the segment,
   said distance in segmentation vector space comprising the components of:
   differences in pixel values between the pixel and the segment,
   differences in motion vector values between the pixel and the segment, and
   a displaced frame difference calculated by applying a motion vector from the segment to the pixel.

2. A method according to claim 1, in which the segments are represented as points.

3. A method according to claim 1, in which the segments are represented as linear functions mapping the vector space of pixel locations to the vector space of pixel values.

4. A method according to claim 1, in which the distance measure is a Euclidean distance.

5. A method according to claim 1, in which the distance measure is a Manhattan distance.

6. A method according to claim 1, in which the coordinate axes are scaled to equalize the variances of the data along each axis.

7. A method according to claim 1, in which the coordinate axes are scaled in order to minimize the product of errors evaluated along each axis, with the constraint that the scaling factors sum to a constant value.

8. A method according to Claim 1, in which the distance measure is a Mahalanobis distance.

9. A method according to claim 1, further comprising the steps of
   determining a covariance matrix of the image data in each segment; and
   measuring a distance in segmentation vector space of each pixel to each segment location taking into consideration said covariance matrix.

10. A method according to claim 9, where the covariance matrix $\Lambda$ of the data in the segment is given by $$\Lambda_{ij} = \frac{1}{K_S - 1} \sum_{k \in S} (x_{ik} - \mu_i)(x_{jk} - \mu_j)$$

where $(x_1, x_2, \ldots, x_N)_k, k \in S$ are vectors in the multidimensional space belonging to segment S, and the location of the segment is given by $$(\mu_1, \mu_2, \ldots, \mu_N) = \frac{1}{K_S} \sum_{k \in S} (x_1, x_2, \ldots, x_N)_k,$$

where $K_s$ is the number of points in segment S.

11. A method according to claim 10, wherein the distance measure is equal to $(x-\mu).\Lambda^{-1}.(x-\mu)^T$.

12. A method according to claim 1, comprising the step for each picture of initially assigning pixels to segments according to the segment membership of the respective pixel in the preceding picture in the sequence.

13. A method according to claim 1, in which each pixel is chosen to be a member of a single segment determined by minimizing the distance measure.

14. A method according to claim 1, in which the number of segments is chosen by the user.

15. A method according to claim 1, in which the number of segments is chosen as a function of the input data.

16. A method according to claim 1, in which the number of segments is chosen so that the variance of an overall error measure approaches a predetermined value.

17. A method according to claim 1, in which two or more parallel versions of the algorithm are run with different numbers of segments and the number of segments chosen is based on the relative performance of the two versions.

18. A method according to claim 1, in which the representations of segments in the vector space are updated according to the segment membership of pixels.

19. A method according to claim 1, in which the processes of assigning pixels to segments and of updating the representations of segments are repeated alternately.

20. A method according to claim 1, in which the initial segmentation is taken from the previous picture in a sequence of pictures.

21. A method according to claim 1, in which the displaced frame differences are calculated by applying motion vectors derived from the current state of the segmentation to the input pixel data.

22. A method of segmenting in a processor image data having a plurality of feature values at each pixel, comprising the steps of
   representing the image data as points in a segmentation vector space which is the product of a vector space of feature values and a vector space of pixel addresses, said segmentation vector space having a canvas which is toroidal such that the location of a segment which would otherwise disappear from one edge of the canvas appears as a result of the toroidal shape of the canvas at an opposing edge of the canvas;
   initially assigning pixels to segments represented as locations in the segmentation vector space, and
   determining, using said processor, the membership of a segment for each pixel according to a distance measured from the data point representing the pixel to the representation of the segment, said distance comprising the components of:
   differences in pixel values between the pixel and the segment, and
   differences in motion vector values between the pixel and the segment.

* * * * *